United States Patent
Sugimoto (10) Patent No.: US 9,106,118 B2
(45) Date of Patent: Aug. 11, 2015

(54) ROTOR HAVING PROJECTIONS FOR POSITIONING PERMANENT MAGNETS AND ELECTRIC MOTOR INCLUDING SUCH ROTOR

(71) Applicant: FANUC CORPORATION, Yamanashi (JP)

(72) Inventor: Yasunori Sugimoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 96 days.

(21) Appl. No.: 14/061,034

(22) Filed: Oct. 23, 2013

(65) Prior Publication Data

US 2014/0117802 A1 May 1, 2014

(30) Foreign Application Priority Data

Oct. 30, 2012 (JP) ................................. 2012-239112

(51) Int. Cl.
  *H02K 1/27* (2006.01)
  *H02K 1/28* (2006.01)

(52) U.S. Cl.
  CPC .................. *H02K 1/28* (2013.01); *H02K 1/278* (2013.01); *H02K 2201/06* (2013.01)

(58) Field of Classification Search
  CPC ......... H02K 1/27; H02K 1/28; H02K 1/2713; H02K 1/278
  USPC ......... 310/156.21, 216.049, 216.051, 156.08, 310/156.12, 156.13, 156.14, 156.19, 310/156.38, 156.41, 156.48, 156.49
  See application file for complete search history.

(56) References Cited

U.S. PATENT DOCUMENTS

| | | | | |
|---|---|---|---|---|
| 6,940,199 B2 * | 9/2005 | Imamura et al. | .......... | 310/156.48 |
| 7,701,100 B2 * | 4/2010 | Morel | .......... | 310/156.19 |
| 8,040,006 B2 * | 10/2011 | Murakami | .......... | 310/156.21 |
| 8,203,245 B2 * | 6/2012 | Ishikawa et al. | .......... | 310/156.12 |
| 8,829,753 B2 * | 9/2014 | Maruyama | .......... | 310/156.28 |
| 8,872,396 B2 * | 10/2014 | Sakata et al. | .......... | 310/43 |
| 2002/0162939 A1 * | 11/2002 | Heidrich | .......... | 248/683 |
| 2013/0257184 A1 * | 10/2013 | Haga et al. | .......... | 310/43 |

FOREIGN PATENT DOCUMENTS

| | | | | | |
|---|---|---|---|---|---|
| JP | 2006204012 A | 3/2006 | | | |
| JP | 2007006621 A | 1/2007 | | | |
| JP | 2011041406 A | 2/2011 | | | |
| JP | 2011259574 A | 12/2011 | | | |
| WO | 2005-041387 | * | 5/2005 | .............. | H02K 1/27 |
| WO | 2011-147498 | * | 12/2011 | .............. | H02K 1/28 |

* cited by examiner

*Primary Examiner* — Burton Mullins
(74) *Attorney, Agent, or Firm* — Fredrikson & Byron, P.A.

(57) ABSTRACT

A rotor includes a rotor core having an outer circumferential surface provided with projections extending in a direction of a rotational axis and projecting outwardly in a radial direction, and a plurality of permanent magnets arranged between the projections. The projections extend at an angle with respect to the direction of a rotational axis. The permanent magnets have inclined sides on both side faces, which incline with respect to the direction of a rotational axis. Side faces of the projections and the inclined side of the permanent magnets which face each other incline so as to define the same angle with respect to the direction of a rotational axis. An electric motor including such a rotor is also provided.

2 Claims, 8 Drawing Sheets

ROTOR HAVING PROJECTIONS FOR POSITIONING PERMANENT MAGNETS AND ELECTRIC MOTOR INCLUDING SUCH ROTOR

BACKGROUND OF THE INVENTION

1. Field of the Invention

The present invention relates to a rotor having projections for positioning permanent magnets mounted on an outer surface thereof, and to an electric motor including such a rotor.

2. Description of the Related Art

In an SPM (Surface Permanent Magnet) type of rotor of an electric motor, in which permanent magnets are mounted on a surface of a sleeve, cogging torque generated due to magnetic attraction and repulsion forces acting between the permanent magnets and stator teeth tends to have a relatively greater influence to the performance. Since cogging torque makes it difficult to accurately control the electric motor, it is necessary to accurately mount the permanent magnets in place in order to prevent cogging torque from unexpectedly generating. A known rotor has a configuration, in which a sleeve is provided with projections on an outer circumferential surface thereof whereby movement of the permanent magnets is restricted to prevent the permanent magnets from dislocating. JP-A-2007-006621 discloses a rotor in which the permanent magnets having a shape which gradually decreases from one end toward the other end are alternately arranged so as to be oriented in opposite directions, in order to position the respective permanent magnets at equal intervals.

There is a need for a rotor which allows the permanent magnets to be accurately positioned in place, and for an electric motor including such a rotor.

BRIEF SUMMARY OF THE INVENTION

According to a first aspect of the present disclosure, a rotor for an electric motor comprising: a rotor core having a first end and a second end in a direction of a rotational axis and having an outer circumferential surface, on which a plurality of projections extending from the first end toward the second end and projecting outwardly in a radial direction are formed; and a plurality of permanent magnets arranged between the plurality of projections and on the outer circumferential surface of the rotor core, wherein the plurality of projections have a first inclined side which incline with respect to the direction of a rotational axis, such that a space defined between the projections adjacent to each other becomes smaller in size at the second end than at the first end, wherein the plurality of permanent magnets have a second inclined side which incline with respect to the direction of a rotational axis, such that a width of the magnet defined in a direction orthogonal to the direction of a rotational axis becomes smaller at the second end than at the first end, and wherein the first inclined side of the projection and the second inclined side of the permanent magnet which face each other incline, respectively, so as to define the same angle with respect to the direction of a rotational axis, can be provided.

According to a second aspect of the present disclosure, in the rotor for an electric motor according to the first aspect, the plurality of magnets have a line-symmetric shape with respect to a line extending parallel to the direction of a rotational axis.

According to a third aspect of the present disclosure, in the rotor for an electric motor according to the first or second aspect, the first inclined side of the projection and the second inclined side of the permanent magnet extend over parts of the projection and the permanent magnet from the second end toward the first end.

According to a fourth aspect of the present disclosure, a rotor for an electric motor comprising: a rotor core having a first end and a second end in a direction of a rotational axis and having an outer circumferential surface, on which a plurality of projections extending from the first end toward the second end and projecting outwardly in a radial direction are formed; and a plurality of permanent magnets arranged between the plurality of projections and on the outer circumferential surface of the rotor core, wherein one of the plurality of projections and the plurality of permanent magnets has a first inclined side which incline with respect to the direction of a rotational axis, wherein the other of the plurality of projections and the plurality of permanent magnets has a first parallel side extending parallel to the direction of a rotational axis, wherein the rotor further comprises an intermediate member arranged between the projection and the permanent magnet, and wherein the intermediate member has a second inclined side which extends so as to face the first inclined side and define the same angle as that of the first inclined side with respect to the direction of a rotational axis, and a second parallel side which extends parallel to the direction of a rotational axis, so as to face the first parallel side, can be provided.

According to a fifth aspect of the present disclosure, an electric motor comprising the rotor according to any one of the first to fourth aspects can be provided.

These and other objects, features and advantages of the present invention will become more apparent in light of the detailed description of exemplary embodiments thereof as illustrated by the drawings.

DETAILED DESCRIPTION OF THE INVENTION

Hereinafter, embodiments of the present invention will be described with reference to the accompanying drawings. It should be noted that the illustrated constituent elements may be modified in size in relation to one another for better understanding of the present invention.

Figure 1:
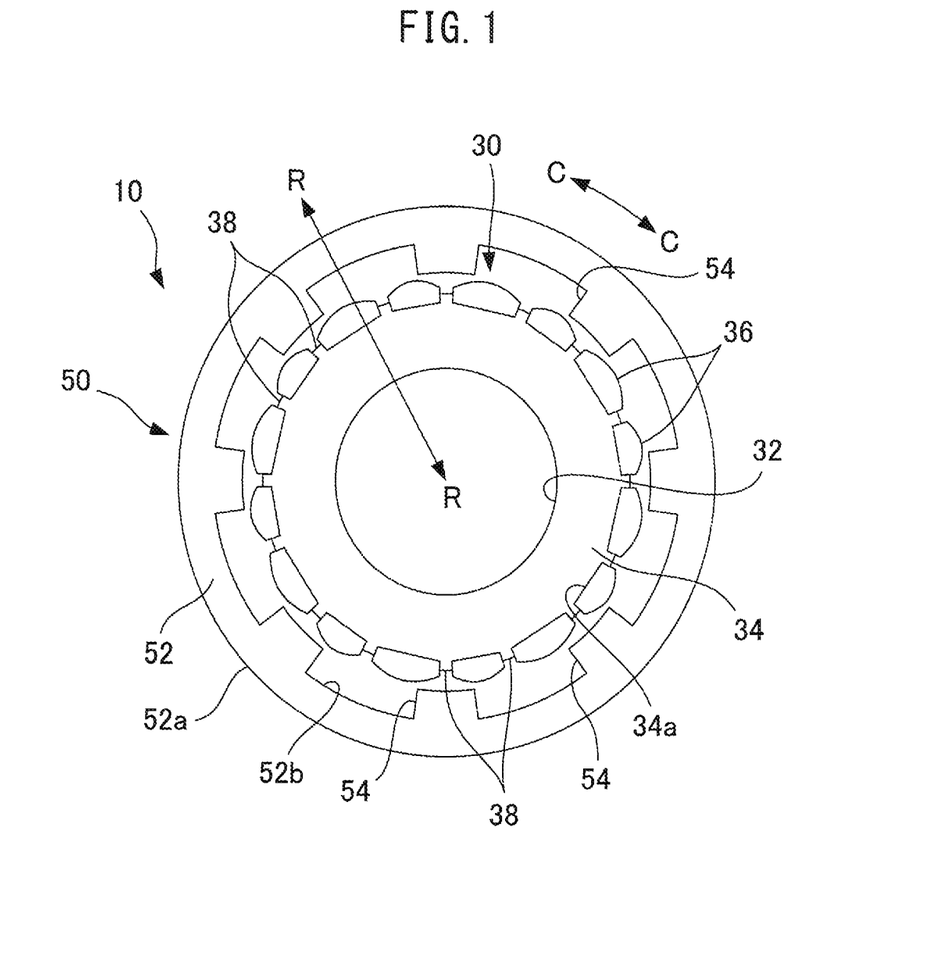
FIG. 1 is a schematic cross-sectional view showing an electric motor according to one embodiment of the present invention.
Figure 2:
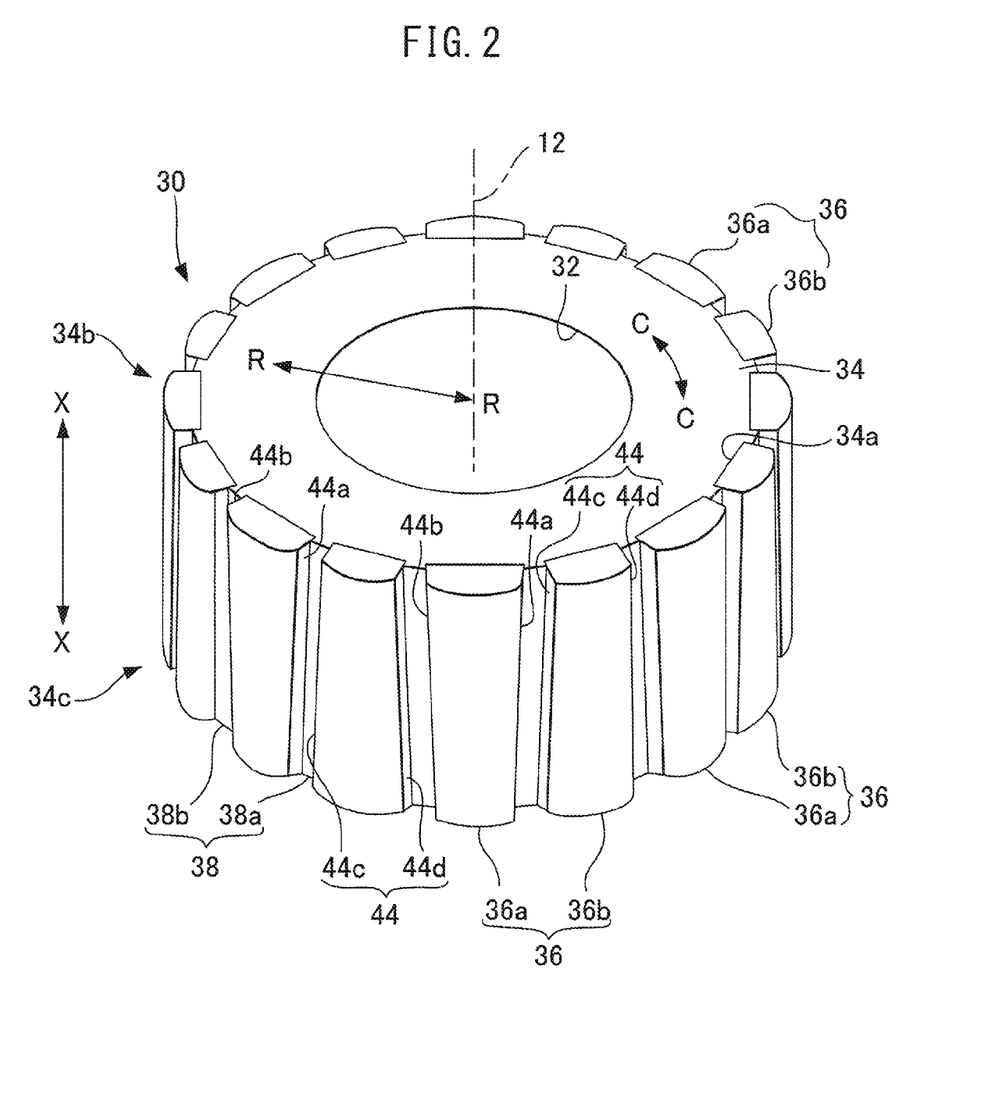
FIG. 2 is a perspective view showing a rotor of the electric motor of FIG. 1.
Figure 3:
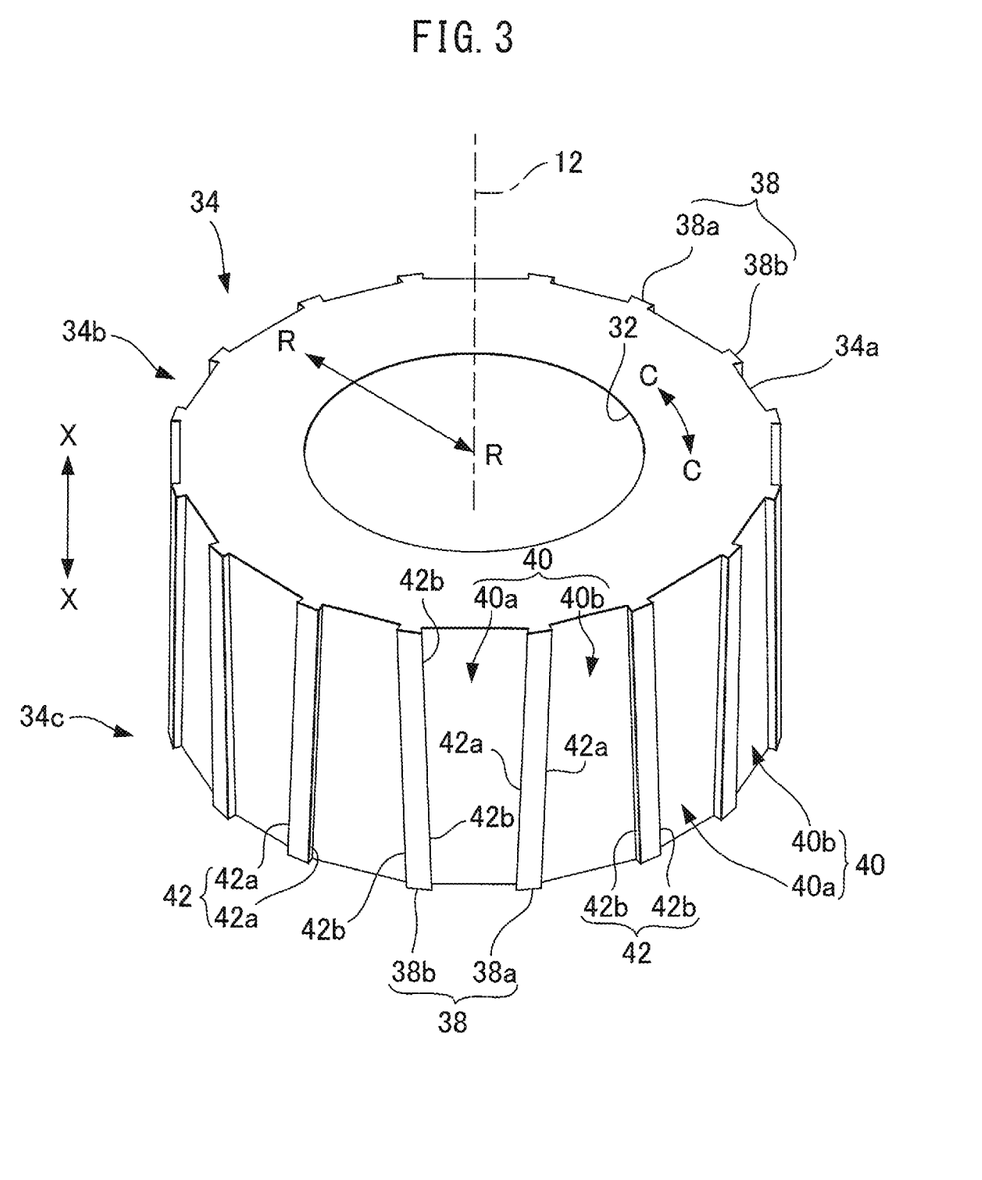
FIG. 3 is a perspective view showing a sleeve of the rotor of FIG. 2.

Referring to FIGS. 1 to 3, an electric motor 10 according to one embodiment of the present invention is explained. FIG. 1 is a schematic cross-sectional view showing the electric motor 10 according to the embodiment of the present invention. FIG. 2 is a perspective view showing a rotor 30 of the electric motor 10 of FIG. 1. FIG. 3 is a perspective view showing a sleeve 34 of the rotor 30 of FIG. 2.

The electric motor 10 includes a rotor 30 having a generally cylindrical shape and rotatable about a rotational axis 12 together with a rotational shaft, which is not shown in the drawings, and a stator 50 arranged to surround an outer circumference of the rotor 30. The electric motor 10 is designed to rotate the rotor 30 by a magnetic interaction between the rotor 30 and the stator 50, and obtained rotational power is used for machining and other various applications.

As illustrated in FIG. 2, the rotor 30 includes a sleeve 34 formed with a shaft hole 32 capable of receiving the rotational shaft at the center thereof, and magnets 36 arranged at approximately equal intervals in a circumferential direction C along an outer circumferential surface 34a of the sleeve 34. The sleeve 34 is an exemplary rotor core formed from a stack of electromagnetic steel plates arranged in a direction parallel to the rotational axis 12 (hereinafter, referred to as "axial direction" and denoted by "X" in the drawings), which are fixed to one another by way of, for example, caulking, adhesive or other fixing means. As will be further described below, the sleeve 34 is provided with a plurality of projections 38 projecting outwardly in a radial direction R on its outer circumferential surface 34a, and the magnets 36 are arranged between the adjacent projections 38 and 38. The magnets 36 are permanent magnets formed by sintering powders of magnetic materials. The magnets 36 are magnetized in the radial direction R, such that magnetic poles of the adjacent magnets 36 are opposite to each other. In other words, when a magnet 36 is magnetized to have the south pole on the inner side in the radial direction R and the north pole on the outer side in the radial direction R, magnets 36 adjacent to the magnet 36 on both sides are magnetized to have the north poles on the inner sides in the radial direction R and the south poles on the outer sides in the radial direction R.

Returning to FIG. 1, the stator 50 includes a stator core 52 of a substantially annular shape having an outer circumferential surface 52a defining a circle concentric to the rotor 30, teeth 54 projecting inwardly in the radial direction R from an inner circumferential surface 52b of the stator core 52, and windings wound around the teeth 54, which are not illustrated in the drawings. The electric motor 10 may also include a casing (not shown) having an inner circumferential surface which is sized to fit the outer circumferential surface 52a of the stator 50. During operation of the electric motor 10, for example, three-phase alternating current is supplied to the windings of the stator 50, whereby the windings serve as electromagnets. The electric motor 10 is designed to rotate the rotor 30 by utilizing repulsion and attraction forces generated between the magnets 36 of the rotor 30 and the teeth 54 of the stator 50.

As illustrated in FIG. 3, the sleeve 34 is provided with projections 38 on the outer circumferential surface 34a, which extend from one end 34b toward the other end 34c along the axial direction X and project outwardly in the radial direction R. A recess 40 is formed between adjacent projections 38 on the outer circumferential surface 34a of the sleeve 34. Although not illustrated in FIG. 3, the respective magnets 36 are intended to be arranged in these recesses 40. Since the recesses 40 are formed in predetermined positions, the magnets 36 can be positioned in place by arranging the magnets 36 in the recesses 40. The projections 38 may be mounted to the sleeve 34 as separate members, or may also be integrally formed with the sleeve 34 or formed by cutting the surface of a cylindrical sleeve.

As illustrated, the projection 38 is a rod-shaped part having inclined sides 42 which incline with respect to the axial direction X from one end 34b toward the other end 34c of the sleeve 34. A first projection 38a and a second projection 38b adjacent to each other incline in the opposite directions with respect to the axial direction X. In other words, the first projection 38a has first inclined sides 42a which incline toward the right side of FIG. 3 with respect to the axial direction X, and the second projections 38b located adjacent to the first projection 38a have second inclined sides 42b which incline toward the left side of FIG. 3 with respect to the axial direction X. Accordingly, between the first projections 38a and the second projections 38b, there are first recesses 40a whose width gradually decreases from one end 34b toward the other end 34c of the sleeve 34 and second recesses 40b whose width gradually increases from one end 34b toward the other end 34c of the sleeve 34, respectively, so as to be arranged alternatingly.

Referring to FIG. 2 again, the magnet 36 has an outer shape which is sized to fit the recess 40 defined by the projections 38. In other words, the magnet 36 has inclined sides 44 inclining from one end 34b toward the other end 34c of the sleeve 34 with respect to the axial direction X. The inclined sides 44 of the magnet 36 extend so as to define the same angles as those of the inclined sides 42 of the opposing projections 38. The adjacent magnets 36 are arranged along the circumferential direction C so as to be oriented in directions opposite of each other.

Specifically, first magnets 36a and second magnets 36b are alternately arranged along the circumferential direction C. The first magnets 36a have width gradually decreasing from one end 34b toward the other end 34c of the sleeve 34 along the axial direction X, and second magnets 36b have width gradually increasing from the one end 34b toward the other end 34c of the sleeve 34 along the axial direction X. The first magnet 36a has a first inclined side 44a inclining toward the right side of FIG. 2 with respect to the axial direction X, and a second inclined side 44b inclining toward the left side of FIG. 2 with respect to the axial direction X. The first inclined side 44a of the first magnet 36a extends parallel to the first inclined side 42a of the opposing first projection 38a, so that the first inclined side 44a of the first magnet 36a and the first inclined side 42a of the first projection 38a define the same angle with respect to the axial direction X. The second inclined side 44b of the first magnet 36a also extends parallel to the second inclined side 42b of the opposing second projection 38b, so that the second inclined side 44b of the first magnet 36a and the second inclined side 42b of the second projection 38b define the same angle with respect to the axial direction X.

On the other hand, the second magnet 36b has a third inclined side 44c inclining toward the right side of FIG. 2 with respect to the axial direction X, and a fourth inclined side 44d inclining toward the left side of FIG. 2 with respect to the axial direction X. The third inclined side 44c of the second magnet 36b extends parallel to the first inclined side 42a of the opposing first projection 38a, so that the third inclined side 44c of the second magnet 36b and the first inclined side 42a of the first projection 38a define the same angle with respect to the axial direction X. The fourth inclined side 44d of the second magnet 36b extends parallel to the second inclined side 42b of the opposing second projection 38b, so that the fourth inclined side 44b of the second magnet 36b and the second inclined side 42b of the second projection 38b define the same angle with respect to the axial direction X.

Figure 4:
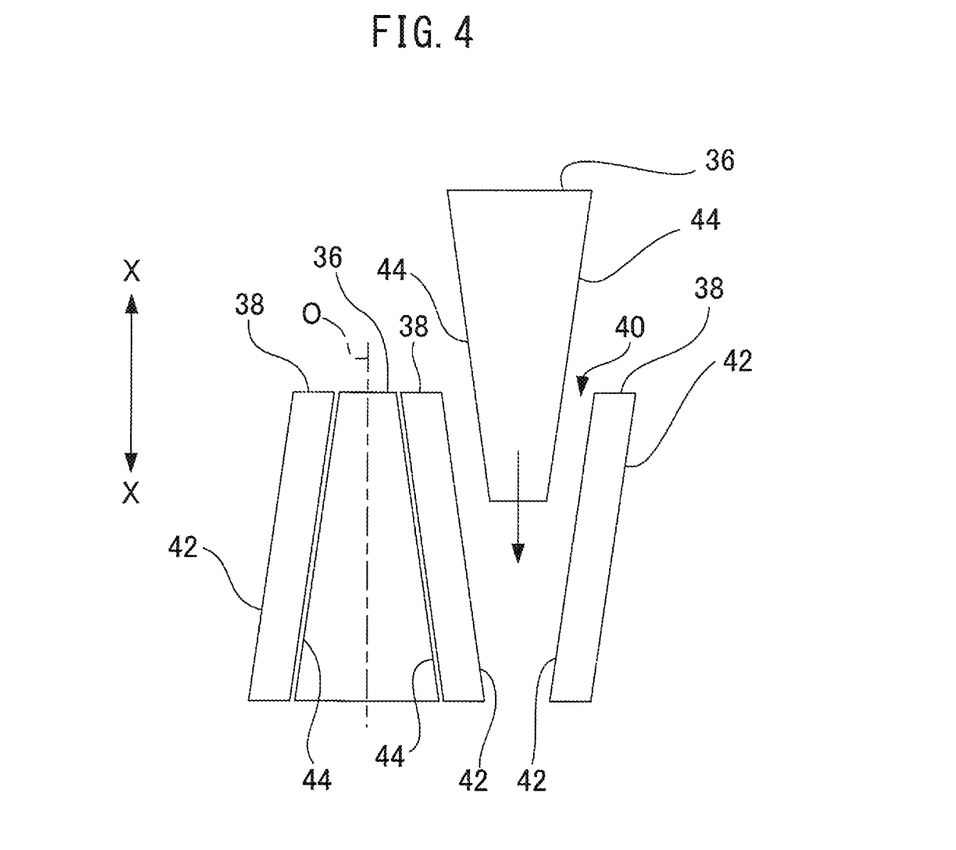
FIG. 4 shows a mechanism for positioning magnets in the rotor of FIG. 2.

FIG. 4 shows a mechanism for positioning the magnets 36 with the aid of the projections 38 in the rotor 30 of FIG. 2. For simplicity, In FIG. 4, only three projections 38 and two magnets 36 are illustrated in a development view. FIG. 4 shows the magnet 36 on the left side arranged between the projections 38, and the magnet 36 on the right side in the process of being inserted into the recess 40 formed between the projections 38. An arrow in FIG. 4 represents a direction in which the magnet 36 is inserted. The magnet 36 illustrated in FIG. 4 has a symmetric shape with respect to a central line O. In the case where the magnet 36 has a line-symmetric shape, the projections 38 can be formed from a repeated structure of the same shapes along the circumferential direction C of the sleeve 34, thereby facilitating the designing and machining processes. Nonetheless, the magnet 36 used in the present invention may have any shape, i.e., it is not limited to a line-symmetric shape.

As described above, the magnet 36 has the inclined side 44 which inclines to define the same angle as that of the inclined side 42 of the projection 38 formed on the sleeve 34. Accordingly, as illustrated in FIG. 4, when the magnet 36 is mounted, the magnet 36 can be inserted by sliding its inclined side 44 on the inclined side 42 of the corresponding projection 38. This facilitates and ensures a process for positioning the magnet 36 in place. According to the present embodiment which ensures that the magnet 36 is positioned in place, unexpected generation of cogging torque can be prevented, and therefore an electric motor which can be accurately controlled can be provided.

Subsequently, different embodiments of the present invention will be explained. Matters which have already been described will be omitted from the following explanation. The same or corresponding elements are designated with the same reference numerals.

Figure 5:
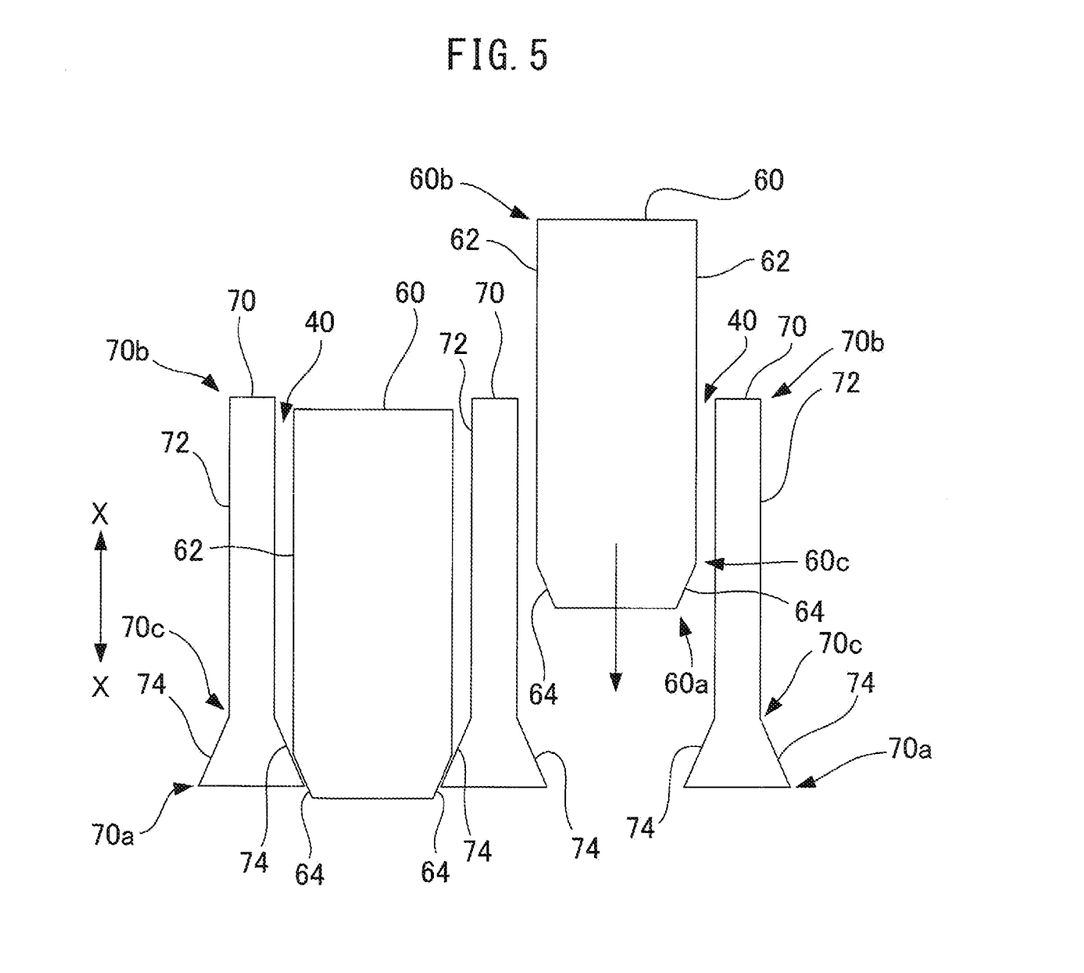
FIG. 5 shows a mechanism for positioning magnets in a rotor according to another embodiment.

FIG. 5 shows a mechanism for positioning magnets 60 with the aid of projections 70 in a rotor according to another embodiment. In FIG. 5, similarly to FIG. 4, only three projections 70 and two magnets 60 are shown in a development view for simplicity. FIG. 5 shows the magnet 60 on the left side arranged between the projections 70, and the magnet 60 on the right side in the process of being inserted between projections 70. An arrow of FIG. 5 represents a direction in which the magnet 60 is inserted.

In the present embodiment, the projection 70 has a parallel side 72 which extends parallel to the axial direction X and an inclined side 74 which inclines with respect to the axial direction X. The inclined side 74 extends between a starting point at one end 70a of the projection 70 in the axial direction X and an ending point at a transition point 70c located between the one end 70a and the other end 70b. In other words, the inclined side 74 of the projection 70 extends over a part of the projection 70 from the one end 70a toward the other end 70b.

On the other hand, the magnet 60 has a parallel side 62 which extends parallel to the axial direction X, and an inclined side 64 which inclines with respect to the axial direction X. The inclined side 64 extends between a starting point at one end 60a of the magnet 60 in the axial direction X and an ending point at a transition point 60c located between the one end 60a and the other end 60b. In other words, the inclined side 64 of the magnet 60 extends over a part of the magnet 60 from the one end 60a toward the other end 60b. It should be noted that although the illustrated magnet 60 has a line-symmetric shape, the shape thereof is not limited to such a specific shape.

In the present embodiment, the inclined side 64 of the magnet 60 and the inclined side 74 of the projection 70 facing the inclined side 64 define the same angle as each other with respect to the axial direction X. This makes it possible to insert the magnet 60 into a recess 40 between the projections 70 by sliding the inclined side 64 of the magnet 60 on the inclined side 74 of the projection 70. Therefore, the magnet 60 can be accurately and easily positioned in place as the magnet 60 illustrated on the left side of FIG. 5. In addition, in the case where the magnet 60 and the projection 70 are formed with the inclined side 64 and 74 on only a part thereof, respectively, an area to be machined decreases, and thus manufacturing is facilitated.

Figure 6:
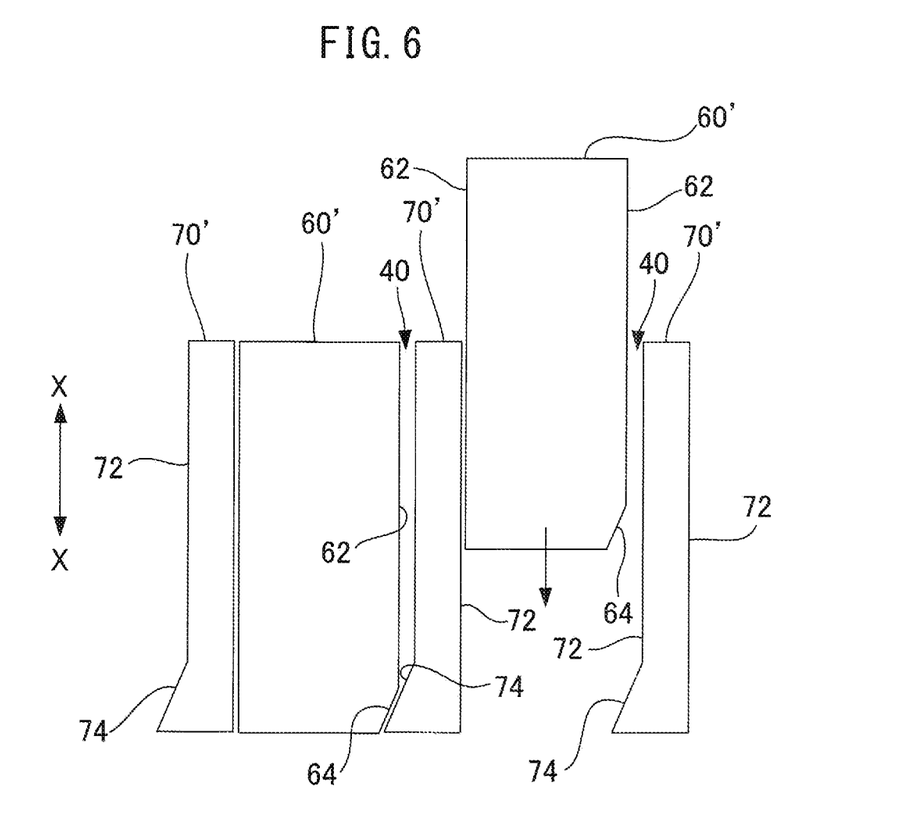
FIG. 6 shows a mechanism for positioning magnets in a rotor according to yet another embodiment.

Heretofore, the magnets 36 and 60 having the inclined sides 44 and 64 on both sides thereof which face the projections 38 and 70 have been described, respectively, by way of example, in association with FIGS. 4 and 5. However, a magnet having such an inclined side on only one of the sides which face projections may also be used. FIG. 6 shows a mechanism for positioning magnets 60' with the aid of projections 70' in a rotor according to a variant of the embodiment of FIG. 5. As illustrated, the projection 70' has an inclined side 74 on one side face thereof, and does not have the inclined side 74 on the other side face. The magnet 60' has an inclined side 64 inclining with respect to the axial direction X on one side face thereof, so as to Corresponding to the shape of the opposing projection 70', and a parallel side 62 extending parallel to the axial direction X on the other side face. Accordingly, in the case where the magnet 60' and the projection 70' have the inclined sides 64 and 74 on only one side face thereof, the magnet 60' can be accurately positioned in a recess 40 between the projections 70', in a similarly way as the other embodiments, with the aid of the inclined side 74 of the projection 70' and the inclined side 64 of the opposing magnet 60,' which are designed to define the same angle as each other.

Figure 7:
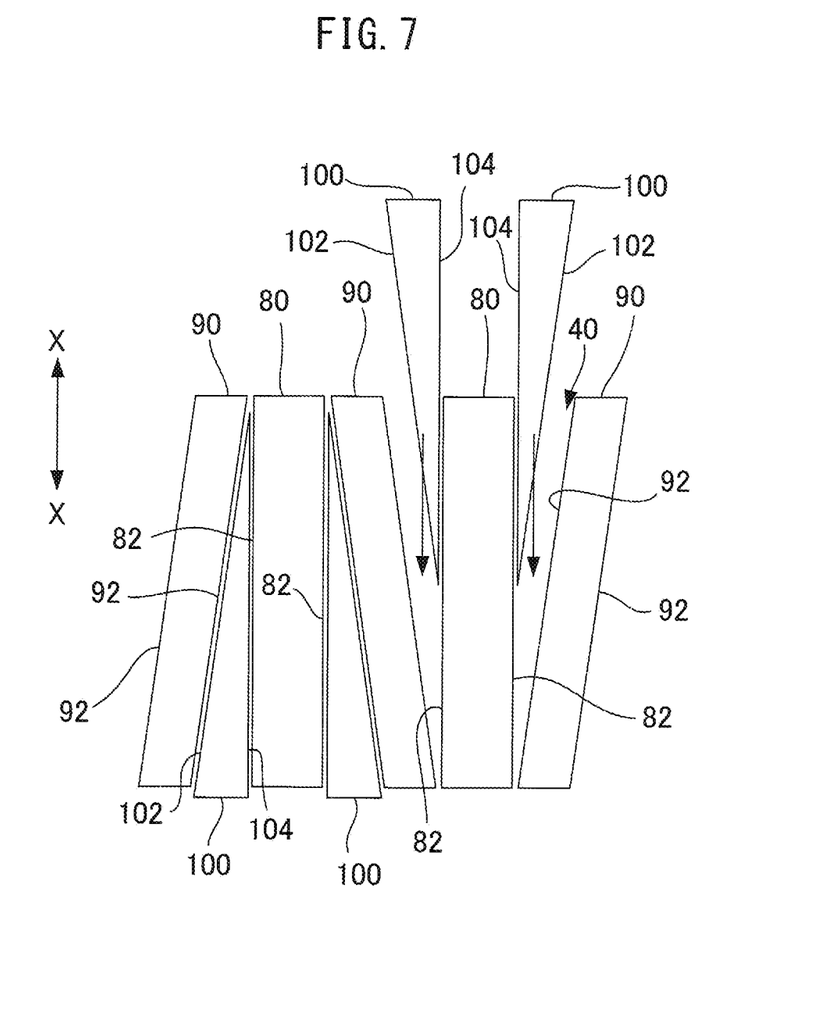
FIG. 7 shows a mechanism for positioning magnets in a rotor according to yet another embodiment.

FIG. 7 shows a mechanism for positioning magnets 80 with the aid of projections 90 in a rotor according to another embodiment. In the present embodiment, there are intermediate members 100 in the form of wedge between the projections 90 and the magnets 80. In FIG. 7, only two magnets 80, the projections 90 and the intermediate members 100 for positioning the magnets 80 are shown in a development view. The magnet 80 on the right side of FIG. 7 is shown in the process in which the intermediate members 100 are inserted. An arrow in FIG. 7 represents a direction in which the intermediate members 100 are inserted.

In the present embodiment, the magnets 80 have parallel sides 82 parallel to the axial direction X, so as to have a substantially rectangular shape in front view. On the other hand, the projections 90 have a similar shape as the projections 38 described in relation to FIG. 4, having inclined sides 92 which incline with respect to the axial direction X and are alternately arranged with each other, so as to be oriented in opposite directions.

The intermediate member 100 has an inclined side 102 on the side face facing the projection 90, and the inclined side 102 defines the same inclining angle as that of the inclined side 92 of the projection 90, with respect to the axial direction X. On the other hand, the intermediate member 100 has a parallel side 104 on the side face facing the magnet 80, which extends parallel to the axial direction X, similarly to the parallel side 82 of the magnet 80. In a rotor according to the present embodiment, during a process for mounting the magnet 80, the magnet 80 is first inserted into a recess 40 formed between the projections 90. Then, the intermediate member 100 is inserted into a space between the magnet 80 and the projection 90. In this way, even in the case where the magnet 80 is not accurately positioned when the magnet 80 is inserted into the recess 40, the magnet 80 can be positioned in place by inserting the intermediate member 100 into the recess 40 while sliding the inclined side 102 of the intermediate member 100 on the inclined side 92 of the projection 90. According to such an embodiment, there is no need to provide the magnet 80 with an inclined side, and therefore the magnet 80 can be easily manufactured.

Figure 8:
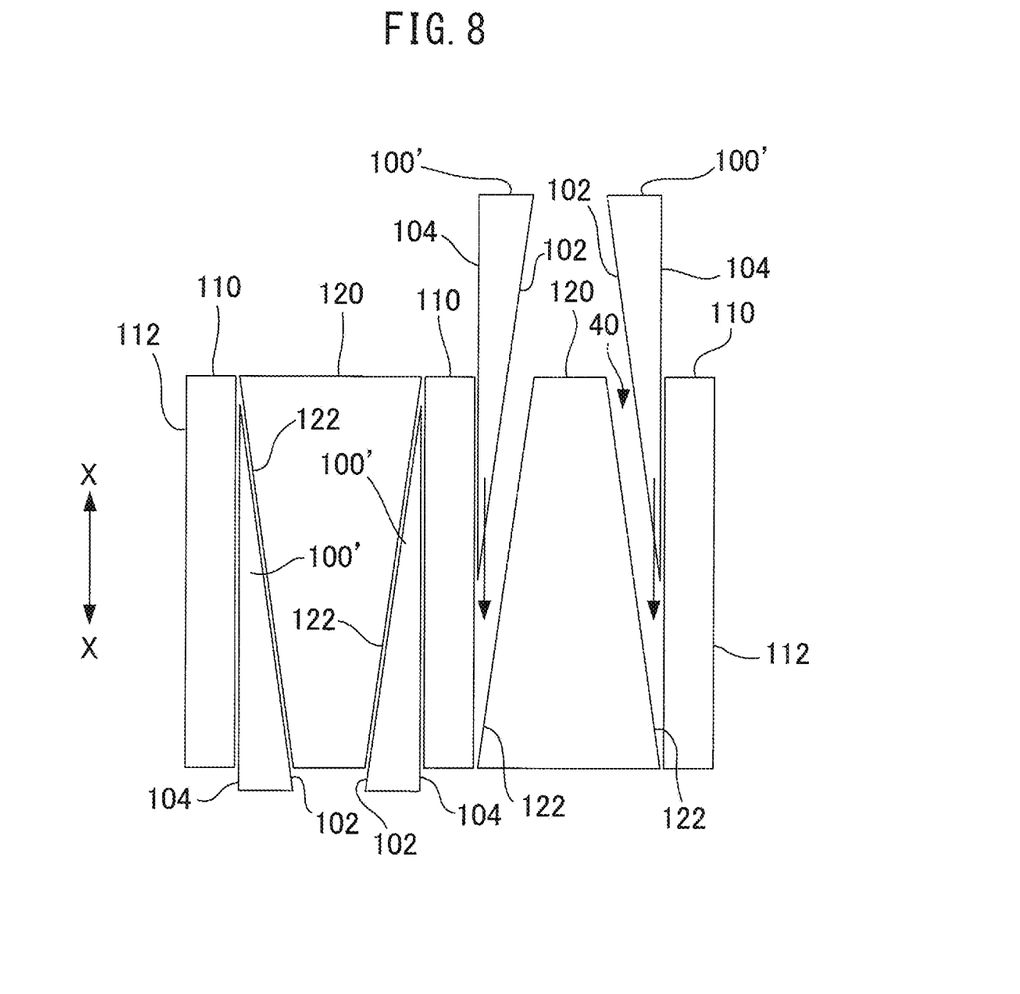
FIG. 8 shows a mechanism for positioning magnets in a rotor according to yet another embodiment.

FIG. 8 shows a mechanism for positioning magnets 120 with the aid of projections 110 in a rotor according to a variant of the embodiment of FIG. 7. In the embodiment of FIG. 7, the magnet 80 has a rectangular shape in a plan view, whereas the projection 90 has an inclined side 92 which inclines with respect to the axial direction X. As opposed thereto, in the embodiment of FIG. 8, the projection 110 has parallel sides 112 extending parallel to the axial direction X on both side faces, so as to have a rectangular shape in a plan view, whereas the magnet 120 has inclined sides 122 which incline with respect to the axial direction X on both side faces thereof, such that the width thereof decreases from one end toward the other end. The intermediate member 100' is similarly shaped as the intermediate member 100 in the embodiment of FIG. 7, having an inclined side 102 inclining with respect to the axial direction X on one side face, and a parallel side 104 extending parallel to the axial direction X on the other side face. It should be noted, however, that the inclined side 102 of the intermediate member 100' in the present variant is arranged so as to face the inclined side 122 of the magnet 120, while the parallel side 104 of the intermediate member 100' is arranged so as to face the parallel side 112 of the projection 110. Similarly to the intermediate member 100 in the embodiment of FIG. 7, the intermediate member 100' is inserted into a space between the magnet 120 and the projection 110, assisting a process for positioning the magnet 120. As a result, the magnet 120 can be reliably and easily positioned in place. In addition, according to such an embodiment, there is no need to provide the projection with an inclined side, and therefore the projection 110 can be easily manufactured.

Effects of the Invention

According to the present invention, projections are formed on a rotor so as to incline with respect to a direction of a rotational axis, and magnets are shaped to incline so as to have the same inclining angle as that of the projections. Alternatively, intermediate members interposed between magnets and projections are shaped to incline so as to have the same inclining angle as that of the opposing magnets or projections. Therefore, a process for mounting the magnets can be carried out by sliding the inclined sides against each other, which face each other and have the same inclining angle. According to the present invention, the magnets can be easily positioned in place, and therefore unexpected generation of cogging torque can be prevented.

Although various embodiments of the present invention have been explained, it is self-evident for a person skilled in the art that the invention may be implemented by any combination of features of the embodiments explicitly or implicitly disclosed herein. In addition, although the invention has been shown and described with exemplary embodiments thereof, it should be understood by a person skilled in the art that the foregoing and various other changes, omissions and additions may be made therein and thereto without departing from the spirit and scope of the invention.

What is claimed is:

1. A rotor for an electric motor comprising:
    a rotor core having a first end and a second end in a direction of a rotational axis and having an outer circumferential surface, on which a plurality of projections extending from the first end toward the second end and projecting outwardly in a radial direction are formed; and
    a plurality of permanent magnets arranged between the plurality of projections and on the outer circumferential surface of the rotor core,
    wherein each of the plurality of projections has a first inclined side which inclines with respect to the direction of a rotational axis, such that a space defined between the projections adjacent to each other becomes smaller in size at the second end than at the first end,
    wherein each of the plurality of permanent magnets has a second inclined side which inclines with respect to the direction of a rotational axis, such that a width of the permanent magnet defined in a direction orthogonal to the direction of a rotational axis becomes smaller at the second end than at the first end,
    wherein the first inclined side of the projection and the second inclined side of the permanent magnet which face each other incline, respectively, so as to define the same angle with respect to the direction of a rotational axis,
    wherein the first inclined side of the projection and the second inclined side of the permanent magnet extend from the second end toward the first end only on a part of the projection and the permanent magnet, respectively, and
    wherein each of the plurality of projections has the first inclined side only on one side thereof, and each of the permanent magnet has the second inclined side only on one side thereof.

2. An electric motor comprising the rotor according to claim 1.

* * * * *